(12) United States Patent
Deimel

(10) Patent No.: US 6,375,762 B1
(45) Date of Patent: Apr. 23, 2002

(54) BASE MATERIAL FOR PRODUCING BLADES FOR CIRCULAR SAWS, CUTTING-OFF WHEELS, MILL SAWS AS WELL AS CUTTING AND SCRAPING DEVICES

(75) Inventor: Hans Joachim Deimel, Remscheid (DE)

(73) Assignee: Carl Aug. Picard GmbH & Co. KG, Remschid (DE)

( * ) Notice: Subject to any disclaimer, the term of this patent is extended or adjusted under 35 U.S.C. 154(b) by 0 days.

(21) Appl. No.: 08/981,125

(22) PCT Filed: Jun. 27, 1996

(86) PCT No.: PCT/EP96/02825

§ 371 Date: Apr. 8, 1998

§ 102(e) Date: Apr. 8, 1998

(87) PCT Pub. No.: WO97/02367

PCT Pub. Date: Jan. 23, 1997

(30) Foreign Application Priority Data

Jun. 30, 1995 (EP) .............................................. 9511027

(51) Int. Cl.[7] ................................................. C23C 8/22
(52) U.S. Cl. ...................................................... 148/319
(58) Field of Search ................................. 148/318, 314

(56) References Cited

U.S. PATENT DOCUMENTS

| | | | |
|---|---|---|---|
| 2,513,713 A | | 7/1950 | Cope |
| 3,661,656 A | * | 5/1972 | Jarleborg |
| 4,857,119 A | * | 8/1989 | Karst et al. ................ 148/318 |
| 5,746,842 A | * | 5/1998 | Eguchi et al. .............. 148/319 |
| 5,772,795 A | * | 6/1998 | Lally et al. ................ 148/221 |
| 5,810,948 A | * | 9/1998 | Nishiwaki et al. .......... 148/318 |

FOREIGN PATENT DOCUMENTS

| | | |
|---|---|---|
| DE | AT A372 709 | 11/1983 |
| DE | 42 27 447 | 2/1993 |
| EP | A 0 024 106 | 2/1981 |
| FR | 2236016 | 1/1975 |
| GB | 1 559690 | 1/1980 |

OTHER PUBLICATIONS

Haerterei Technische Mitteilungen, vol. 45, Mar. 1990–Apr. 1990, Munchen DE, pp. 129–132.

Haerterei Technische Mitteilungen, vol. 50, Mar. 1995–Apr. 1995, Munchen DE, pp. 86–92.

* cited by examiner

Primary Examiner—John Sheehan
(74) Attorney, Agent, or Firm—Kilpatrick Stockton LL

(57) ABSTRACT

The base material consists of a base steel having a base carbon content of less than 0.3 wt % carbon and enriched with carbon starting from its surface 2,3,4 formed of formed of two broad surfaces 2, two short edge sides 3 and two long edge sides 4. The base steel has boundary areas 5 enriched with 0.5–1.1 wt % carbon starting from at least one broad surface 2 and transforming with a decreasing carbon content into an area 6 not enriched with carbon or only slightly enriched. At the edge surface 3,4, the base material has the sandwich structure formed of the carbon-enriched boundary area 5 and the area 6 not enriched with carbon. (FIG. 1)

20 Claims, 5 Drawing Sheets

Carbon level over the cross section

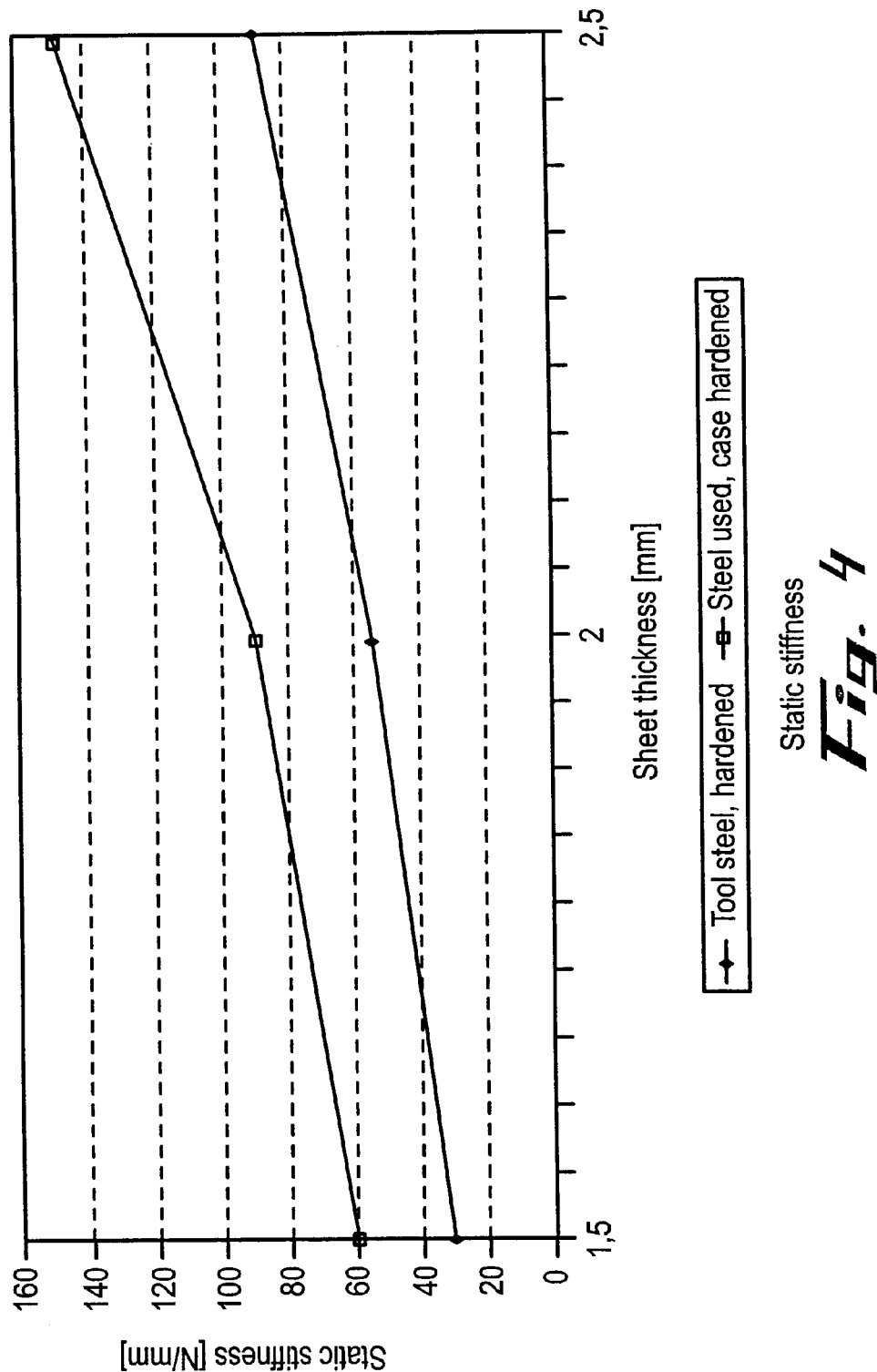

Figure 1:
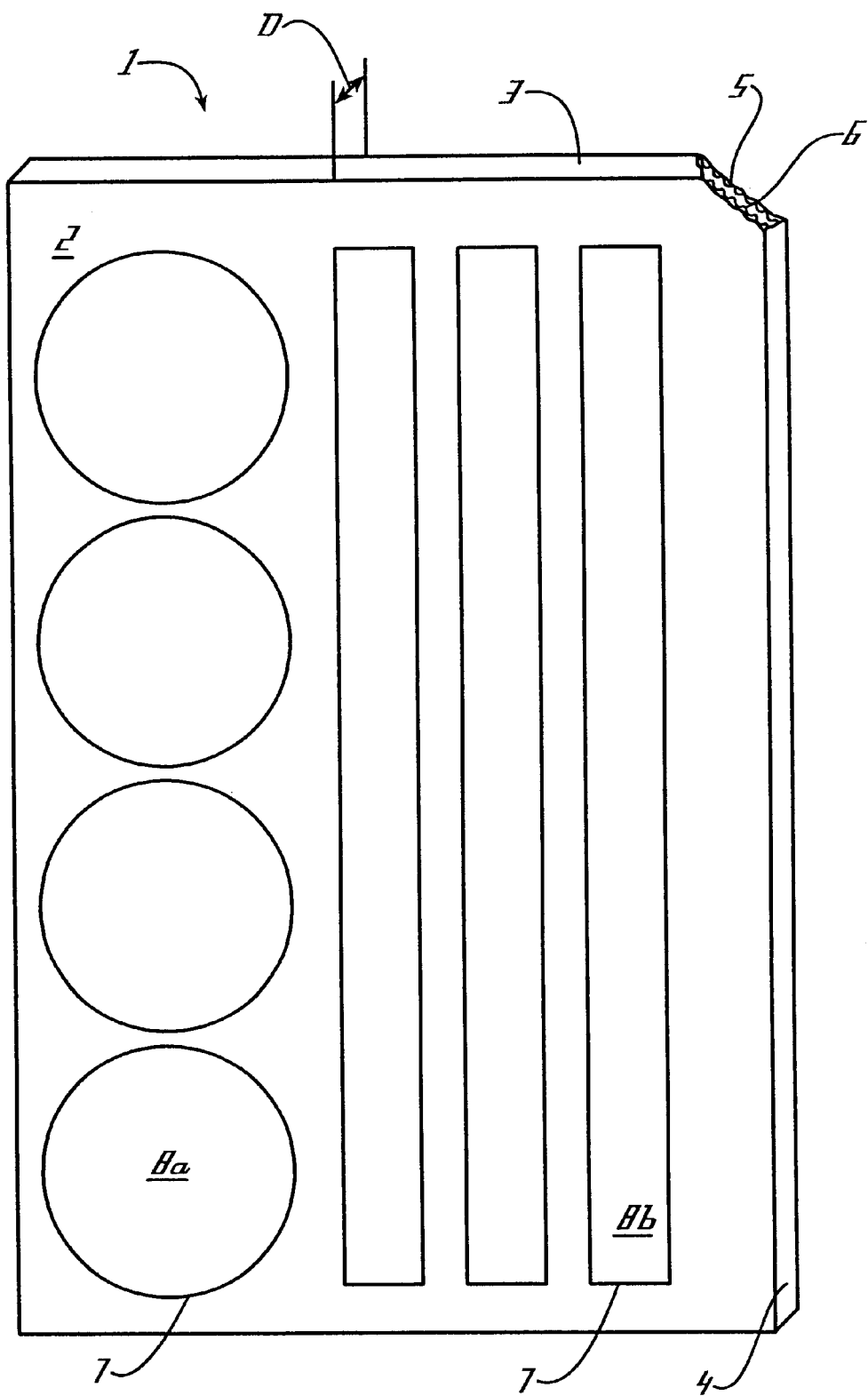

BASE MATERIAL FOR PRODUCING BLADES FOR CIRCULAR SAWS, CUTTING-OFF WHEELS, MILL SAWS AS WELL AS CUTTING AND SCRAPING DEVICES

The invention pertains to a base material for the production of blank blades, particularly for circular saws, cutoff wheels, gang saws, as well as for cutting and scraping devices, consisting of a base steel enriched with carbon starting from its surface consisting of two broad surfaces, two end face surfaces and two long edge surfaces, wherein the base steel has a basic carbon content of less than 0.3 wt % carbon.

It is conventional to use tool steels with a carbon content between 0.5–1.0 wt % or low-alloyed structural steel (as steel for tempering) in order to produce a base material for the production of blank blades, particularly for circular saws, cutoff wheels, gang saws, as well as for cutting and scraping devices. The heat treatment of these materials is then done with the objective of obtaining a homogeneous texture and a uniformly high hardness over the entire thickness range. The necessary toughness of the base materials is achieved by a controlled tempering, the latter, however, necessarily being connected to losses of hardness. Depending on the purpose of use and the specific load on the base material, for saws, for instance, hardness values between-roughly 37–50 HRC are produced.

Particularly in the hot-rolling process of a typically used tool or tempering steel and in the austenitization treatment of it for hardening, the carbon diffuses out of the boundary layer of the material. A decarbonization of the surface results, so that the decarbonized boundary layer with low hardness has to be ground away after heat treatment.

In order to improve service life, a large number of saws are hard-chrome-plated, tipped with hard metal or diamonds or stellitized. The tipping is done by soldering or sintering. These measures lead to clear improvements of service life without, however, influencing the inherent strength of the blank blades. The manufacturing costs of these saws are markedly increased by the measures for increasing service life. This necessarily leads to a reduction of the teeth or number of segments, which worsens the cutting quality and increases the noise emission.

In the corporate publication "Sie+Wir" of the Stahlwerke Südwestfalen, No. 14/1975, manufacturing processes for various types of saws are described, reference being made to the fact that there is always a demand for a sheet which is as free of strains as possible with low decarbonization values and homogeneous texture formation. The steels used must have a very fine-grained texture with good tenacity after hardening and tempering, so that the very high centrifugal and shearing forces that appear can be securely absorbed.

The typification of the saws in the aforementioned corporate publication relies on a customary division into three groups, corresponding to the material to be cut. According to the material group, different requirements are placed on the properties of the saws. These groups are:

1. saws for wood and plastic (circular wood saws, hard metal tipped circular saws, forestry and gang saws;
2. saws for metal (segmented circular saws, cutoff saws, circular hot sawing machines);
3. saws for stone (diamond-tipped circular saws, diamond-tipped slab saws).

One of the requirements of saw blades is the presence of a high bending stiffness or shape stability. To stabilize slab, band, circular, and quick-cutting saw blades as well as diamond discs, in particular to compensate for strains produced by nonuniform heating in the tool body, a known procedure consists in producing internal strains in certain zones deliberately by tensioning the blade ("Comparative studies on the tensioning of circular saw blades with machines and flattening hammers," in the special issue of Holz als Roh- und Werkstoff, Vol. 21 (1963), pp. 135–144). Such a generation of internal strains can be accomplished in hardened steel disks or bands by cold hammering with a hammer or mechanically by rolling or pressing, but in any case, it represents an elaborate processing step in manufacturing.

The thermochemical enrichment of iron and steel materials with carbon has been known for some time, and is referred to as case-hardening; If nitrogen is introduced into the material at the same time, one speaks of carbonitriding. An overview of caburizing, with special emphasis in regard to a mathematical modeling of it, is provided, for instance, by the article "The carburizing process" in Härterei Technische Mitteilungen, Vol. 50 (1995) No. 2, pp. 86–92. The carburizing process can take place in a gaseous medium, in a salt bath or in powder and is generally performed at temperatures between 900–1000° C. As carbon donors, agents are employed here whose carbon activity must be higher than that of the iron material. The carbon emitted from the carburizing agent diffuses into the boundary layer of the workpiece to be carburized. A characteristic carbon concentration profile results, according to the selected process parameters, such as temperature and treatment time, as well as the carbon activity of the carburizing agent and the composition of the iron material. The carbon concentration declines continuously with increasing distance from the boundary, until it reaches the initial level of the material in the inside of the material. The carburizing depth $A_t$ is to be considered a characteristic parameter of significance for practice in this regard. The carburizing depth $A_t$ is defined as the vertical distance from the surface up to a boundary characterizing the thickness of the layer enriched with carbon. The carbon content at which this boundary is assumed to exist is subject to standardization (cf. DIN EN 10 052) and is generally agreed to be 0.35 wt % carbon. The carburizing depth $A_t$ of a material increases with increasing duration of carburizing of a workpiece, the geometry of the latter also playing a role. For convex-curved workpiece surfaces, at edges or points, therefore, a greater carburizing depth $A_t$ occurs, since a comparatively smaller volume-is available to the carbon diffusing in from all sides. Thereby an excess carbonization can occur, which is characterized by the separation of carbides or by an undesired residual austenite content after hardening.

A method of this class for producing highly alloyed strip steel which is used for quick-cutting and tool steel as used for, among other things, the purpose of manufacturing blades and cutters found in razor blades or metal saw blades, has become known from DE-OS 2,431,797. The high content of alloy elements and the type of alloy elements, e.g. 12–13 wt % chromium, whereby a high hot hardness can be achieved, corresponds to this purpose of the strip steel for metal saws or razor blades, classified in the second group-according to the division above. Highly alloyed steels with additional high carbon content are difficult to process using hot and cold rolling in the manufacturing process, i.e., they are at risk for cracking and fracturing. Therefore a strip material with low carbon content is first either sintered or cold-rolled and subsequently enriched with carbon, either over its entire surface or partially, in the edge area. The carbon enrichment is done over the entire cross section or thickness of the strip material. Thus a carbon concentration corresponding in its level to the carbon concentration of tool steels results with almost a constant profile over the entire thickness of the strip material, slight corresponding to the foreseen usage of the material.

From AT-PS 372,709, a cutting tool, specifically a saw, made of alloyed steel is known, which is enriched in the area of its working surfaces or teeth with 1.8–2.2 wt % carbon to a depth of 0.02–0.10 mm, the carbon content at a depth of 0.15–0.25 mm reaching the carbon content. The steel alloy consists of iron with the unavoidable impurities and contains 0.1–0.3 wt % carbon, 0.2–2.0 wt % silicon, 0.5–1.5 wt % manganese, 5.0–7.0 wt % chromium, 1.0–2.0 wt % tungsten, 1.0–2.0 wt % molybdenum, 0–2.0 wt % vanadium, 0–0.5 wt % titanium, and 0–0.5 wt % niobium. To produce the cutting tool, the workpiece blank, specifically, the saw blade, is subjected to a case-hardening at temperatures in the range of 850–1050° C., whereafter the hardening in air, oil or in a hot bath takes place. The slight carburization depth $A_t$ and the strong case hardening lead to a carbon gradient from the broad surface to the area not enriched with carbon of roughly 6–14 wt % C/mm in the boundary area of the base steel. In this way it is intended, in particular, for a surface layer of elevated wear resistance to be achieved. The alloy employed is a special steel, corresponding by its content-of alloy elements to a high-speed steel, but without having a correspondingly high carbon content. The carbon content here is typical of carburized steels, but the alloy content is atypical. The use of such a material pursues the goal of replacing fast-machining-steel by the alloy specified and treated in the manner described. Here too, similar to the method corresponding to DE-OS 2,431,797, a reduction of the manufacturing costs by reducing the risk of rejects and a savings in material by avoiding an overuse of strip steel in its forming processes is intended. In the process, a high hot hardness in the workpiece can be achieved, which is characterized by tempering temperatures of 500° C. and more. Given the core hardness of the material, a value of 45–55 HRC can be assumed, as with fast-machining steels.

A disadvantage of this cutting tool and its manufacturing method consists in the fact that band saws are expressly out of the question, presumably, because the necessary tensile and reversed bending fatigue strength cannot be achieved. As workpiece blanks, moreover, keyhole saw blades are produced by stamping, milling and setting the teeth, and are only thereafter case-hardened, hardened and tempered. It must be assumed however, that after this treatment the saw blades can no longer have their teeth set, because of their high carbon content. Because of the case hardening taking place omnidirectionally, moreover, an excessive carbon enrichment may occur in certain edge areas, as described above, which has an unfavorable effect on the edge properties and strength of the teeth because it causes embrittlement of the material.

The invention is based on the problem of specifying a base material of the generic type with which blank blades for circular saws, cutoff disks, gang saws and cutting and scraping devices with enhanced component strength can be produced while avoiding the formation of a decarbonized edge area, wherein a higher hardness at the surface is possible to increase wear resistance with identical operating and fracture safety and the noise emission in the operating state is reduced. It should furthermore be possible for untipped saws for wood and plastic, such as circular wood saws, forestry or gang saws to be produced from this base material, which are distinguished by a long service life with low production expense.

This problem is solved by a base material of the generic type in which the base steel has boundary areas enriched by a thermochemical treatment with 0.5–1.1 wt % carbon starting from a least one outside surface and making a transition with decreasing carbon content to an area not enriched at all with carbon, or only enriched slightly, while, at the edge surfaces, the base material has the sandwich structure formed by the boundary area enriched with carbon and the area not enriched with carbon. The thermochemical treatment is preferably a carburizing process, but can also advantageously be a carbonitriding process, if the carburizing medium contains nitrogen or nitrogen compounds, such as ammonia. The nitrides formed in this manner in the base material according to the invention cause an additional elevation of wear resistance and counter fatiguing of the material.

In this manner, the tool steels with a high degree of purity that are ordinarily used can be can be replaced by the base material according to the invention, whose base steel, preferably low-alloyed or unalloyed structural steel, need not meet these purity requirements. Special steels are not required as starting materials, which implies a reduction of the steel manufacturing costs. With the base material according to the invention, it is not only for an elevated wear resistance to be achieved at the broad surfaces, but also a greater component strength, characterized by a greater bending strength, static bending strength and reversed bending strength.

The base material can advantageously also have a sandwich structure which consists of a broad surface enriched with carbon, an inner core not enriched or only slightly enriched with carbon and an additional broad surface of the base steel enriched with carbon. After the production of saws, cutoff disks or cutting devices, this structure is then also present on the saw teeth or blades. With repeated use of the tool, an uneven wear results over the thickness of the material, specifically a so-called cratering. That is to say, the hard and wear-resistant broad surfaces wear more slowly than the core which is not enriched with carbon, whereby the edge surface obtains a concave shape and a self-sharpening effect occurs in the cutting area.

It has been shown that, since the physical properties of the base material can be gradually changed by differing carbon contents, it is of particular advantage for the wear and strength properties to be achieved in the blank blades if the quotient of a carburizing depth $A_t$ of the edge area, in which the carbon content is 0.35 wt %, and the thickness of the base material had a value of 0.15–0.40. The depth of the carburized area can preferably be chosen such that, after hardening and tempering of the thermochemically treated base material, at most roughly ⅓ of the total depth of the base steel has essentially the original hardness of the base steel or a slightly higher hardness, and at least roughly ⅔ of the thickness of the base material has a higher hardness. In particular, it is preferred that, after hardening and tempering of the thermochemically treated base steel, at least roughly 50% of the thickness of the base material has essentially the original hardness of the base steel or a slightly higher hardness, and at least roughly 50% of the thickness of the base material has a higher hardness. After hardening and tempering, the hardness of the broad surfaces of the base material advantageously lies in the range of roughly 50–63 HRC preferably in the range of 55–60 HRC and, in the area not enriched with carbon, 20–40, preferably, 30–35 HRC. The enrichment of the base steel with carbon on both sides over the entire broad surface of the steel sheet, but the carbon enrichment can also be conducted only partially, in the later toothed area of the on both sides, or partial areas, at subsequent soldering areas or the like, can be provided which are excluded from carbon enrichment. The areas not enriched with carbon or only slightly enriched consist after hardening and tempering of a-mixed structure of ferrite and perlite and/or of bainite, preferably in its lower stage.

Thus it is possible, with low requirements on the base steel for saws to be produced which consists of a steel sheet that is enriched with carbon on both sides, for instance, or only partially, by means of a thermochemical treatment, particularly carburizing. Surprisingly, it was established that, with a base steel having a very low carbon content of 0.1–0.2 wt % and subsequent case hardening as well as hardening and tempering, saws can be produced with better quality which have no linear/hardness strength profile with respect to their thickness and surface. The boundary area enriched with carbon here favorably has a mean carbon gradient of roughly 0.25–0.75 wt % C/mm, preferably 0.40–0.50 wt % C/mm for the surface to the area not enriched with carbon.

While conventional saws have a martensitic structure throughout with homogeneous properties, this is present in the saws produced from the base material according to the invention only at the surfaces of the areas enriched with carbon. The requirements for toughness are largely met by the softer core, while, in case of a saw that is not tipped or stellitized, the surface determines the good cutting properties and high stability of the saw with its hardness.

As already presented, low- or nonalloyed structural steels are preferred as base steels for the base material according to the invention. Thus all steels that can be used, alloyed or unalloyed, as hardened steels are suited for the base material according to the invention. Heat-treatable steels with low carbon contents, as well as rust- and acid-resistant steels with an elevated chromium content (12–13 wt %) can likewise be used. In Table I, such steels that can be utilized according to the invention are presented by way of example, without the invention being limited to these, however.

TABLE I

Possible base steels for the base material according to the invention

| Designation per DIN 17006 | Designation per DIN 17006 | Alloy type, wt % |
| --- | --- | --- |
| C 10 | 1.1121 | 0.10 C |
| C 15 | 1.1141 | 0.15 C |
| 15 Cr 3 | 1.7015 | 0.15 C; 0.6 Cr |
| 16 MnCr 5 | 1.7131 | 0.16 C; 1.2 Mn; 0.9 Cr |
| 15 CrNi 6 | 1.5919 | 0.15 C; 1.5 Cr; 1.6 Ni |
| 18 CrNi 8 | 1.5920 | 0.18 C; 2.0 Cr; 2.0 Ni |
| 25 CrMo 4 | 1.7218 | 0.26 C; 1.1 Cr; 0.3 Mo |
| X 10 Cr 13 | 1.4006 | 0.11 C; 13 Cr |

Figure 2:
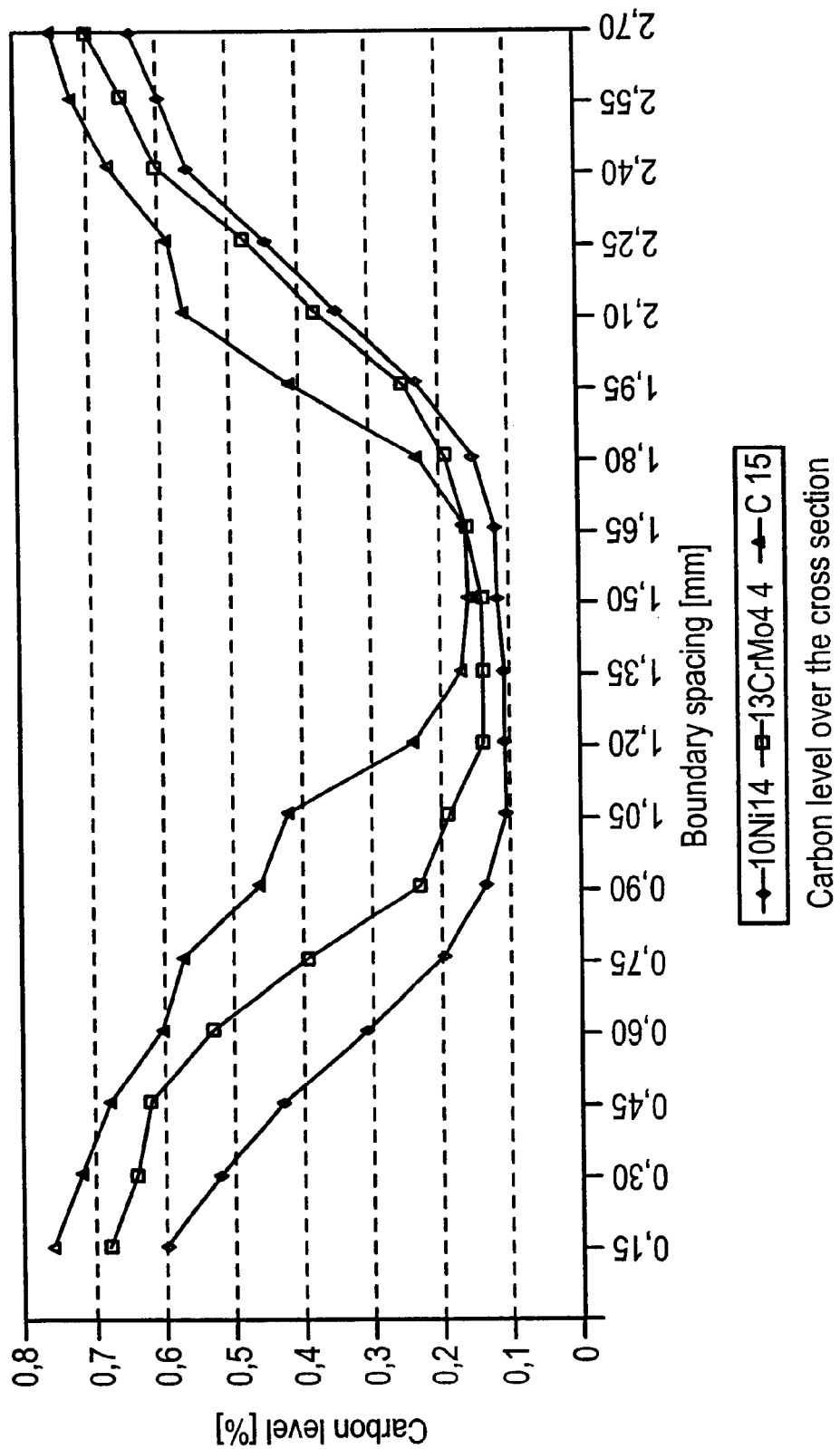
Figure 1:
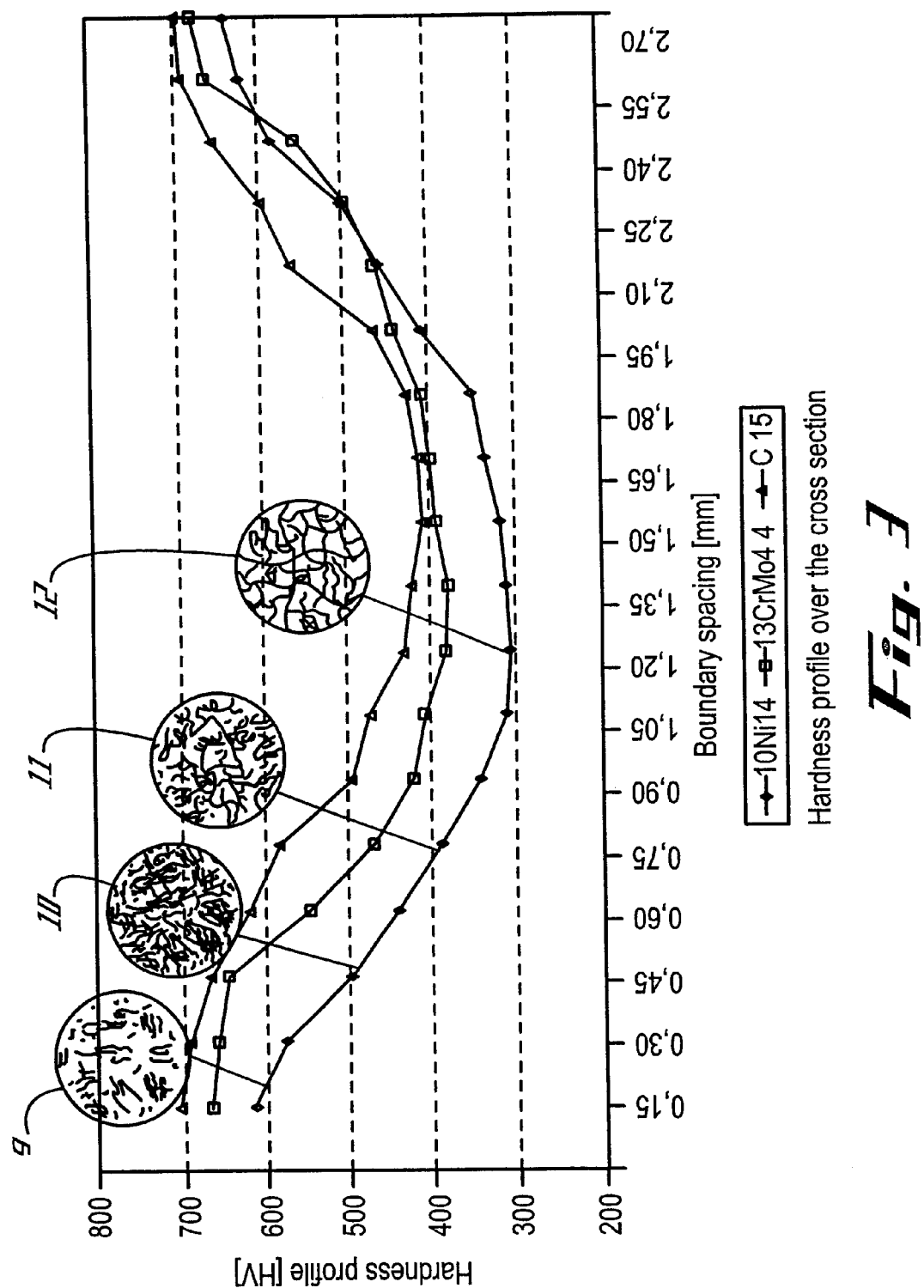
Figure 5:
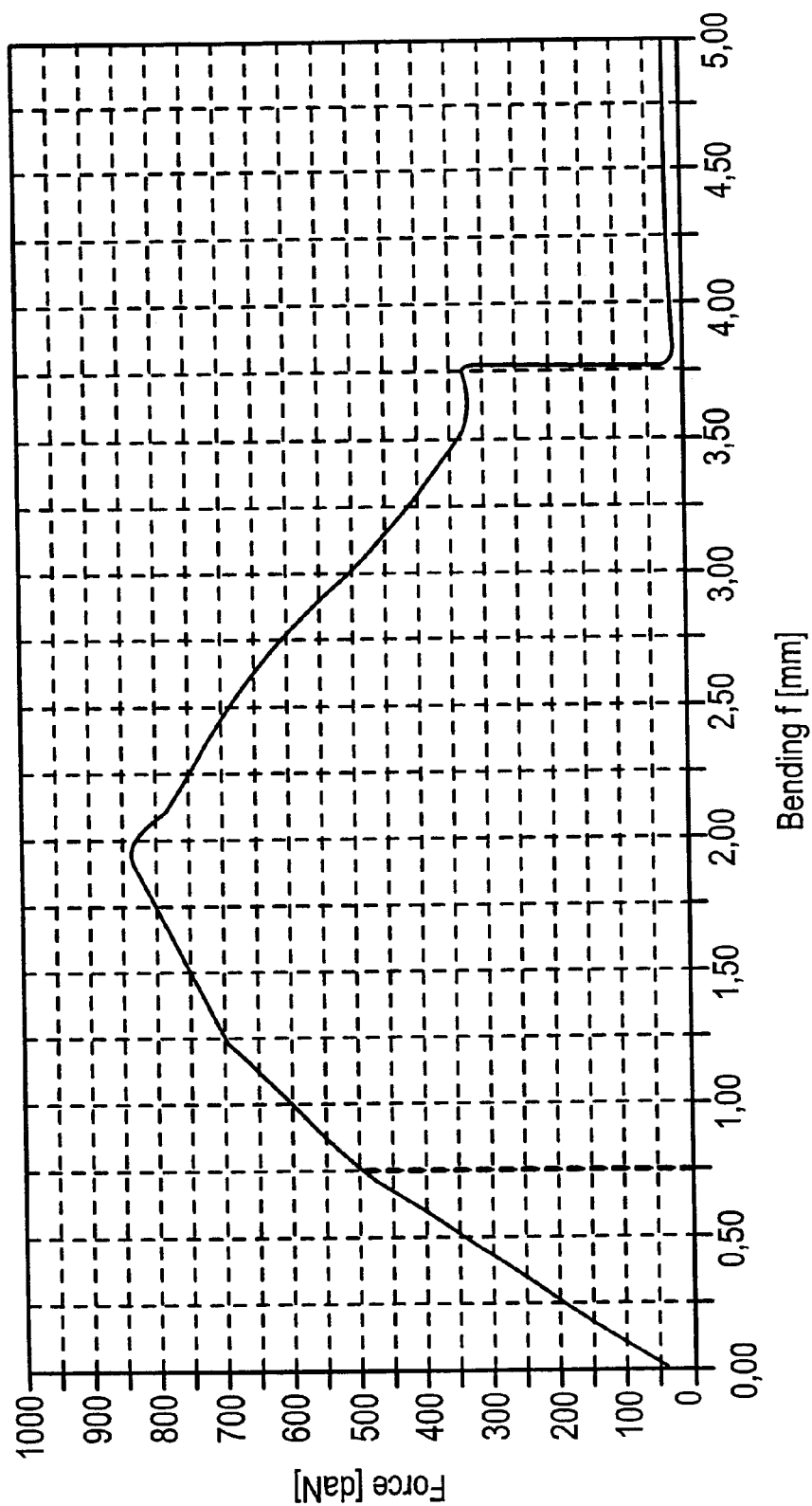

The invention is explained in further detail on the basis of several examples with reference to the attached drawings. These show in:

FIG. 1, a view in perspective of a plate of a base material according to the invention for the production of blank blades for circular saws, cutoff disks, mill saws and cutting and scraping devices;

FIG. 2, the comparative presentation of the carbon concentration profiles of three qualities of the base material according to the invention, produced using various types of steel as the base steel;

FIG. 3, the comparative presentation of the hardness profiles of the base materials according to the invention from FIG. 2;

FIG. 4, the comparative presentation of the static bending stiffness of a conventional base material made of hardened tool steel and of a base material according to the invention for differing sheet thicknesses; and FIG. 5, the result of a bending test on flat samples of a base material according to the invention in the form of a force/deformation diagram.

In FIG. 1, a plate 1 of a base material according to the invention of the type that is characteristic of all embodiments described below is shown. The surface of the plate 1 is formed of two broad surfaces 2, as well as two end face surfaces 3 and two long edge surfaces 4. As a base material for the blade blanks to be manufactured, plates 1 of this type are-trimmed on the end face surfaces 3 and the long edge surfaces 4 after thermochemical treatment and are supplied to the manufacturer in this form, or the tool manufacturer stamps out or laser-cuts the desired parts such that machining of carburized areas of the edge surfaces 3,4 is avoided. According to the invention, the base material is enriched with carbon only going out from the broad surfaces 2 and not from the edge surfaces 3,4. As a result of the thermochemical treatment, the base material has boundary areas 5 enriched with 0.5–1.1 wt % carbon starting from the broad surface 2 and making a transition with decreasing carbon content to an area 6 not enriched with carbon, in this case, a core area 6, due to the carburization on both sides. At the edge surfaces 3,4, the base material has the sandwich structure formed of the boundary area 5 enriched with carbon and the area 6 not enriched with carbon.

In the illustration, 7 of saw blade blanks 8a for circular saws and saw blade blanks for gang saws 8b are indicated. To produce the plate 1 of the base material according to the invention, the starting point was one of the base steels indicated below with a carbon content of less than 0.3 wt % carbon.

EXAMPLE 1

Material Utilized: C 15 Cold-rolled Strip, Annealed Sample Thickness: D=2.5–2.7 mm A thin-layer carburization was performed on several samples at a temperature between 880–930° C. and a treatment duration in the range of 60–90 min in an endogenous atmosphere enriched with propane so that, as can be seen from FIG. 2, a boundary layer 5 resulted, with a mean penetration depth $A_t$ of roughly 0.8 mm with a scattering from roughly 0.6–1.0 mm. The quotient of the penetration depth $A_t$ of the boundary area 5 of the thermochemically treated base steel and the thickness D of the base material took on values from 0.15–0.40 and averaged 0.32. As FIG. 2 further shows, the carbon content directly on the broad surfaces lay between 0.7 and 0.8 wt %. The carbon-enriched boundary area 5 of the base steel had a mean carbon gradient of roughly 0.30–0.55 wt % C/mm broad surface 2 to the area 6 not enriched with carbon.

The subsequent hardening at a temperature in the range of 820–860° C. with oil quenching resulted with good flatness of the base material plate 1 in hardnesses of roughly 63–65 HRC at the broad surfaces 2 and 44 HRC in the core 6. After a tempering period of 3 h at a temperature of 260°[C], found to be optimal, hardness values of 56 HRC (700 HV) on the flat surface 2 and 40 HRC (400 HV) in the core 6 were achieved as FIG. 3 shows. The carbon enriched boundary area 5 of the base material had a mean hardness gradient between 9–15 HRC from the broad surface 2 to the area 6 not enriched with carbon or only slightly enriched. In the presence of such a hardness profile curve, setting of the saw teeth can still be performed using this base material for saws. A saw produced from this base material is distinguished by a high stiffness and dynamic stressability, is very quiet and has a hardness roughly 10 HRC greater than a saw known from the prior art, but also has very good wear resistance. This base material appears to be particularly suited for nonrotating saws and for cutting and scraping devices.

EXAMPLE 2

Material Utilized: 13 CrMo 4 4 Cold-rolled Strip, Annealed
Sample Thickness: D=2.4–2.7 mm A thin-layer gas carburization was conducted on several samples with process parameters as in the first embodiment, so that, as FIG. 2 illustrates, a boundary layer 5 with a mean penetration depth $A_t$ of 0.7 mm resulted. The quotient of the carburizing depth $A_t$ of the boundary area 5 of the thermochemically treated base steel and the thickness D of the base material took on mean values of about 0.25. As FIG. 2 also shows, the carbon content directly on the broad surfaces 2 was roughly 0.7 wt %. The carbon-enriched boundary area 5 of the base steel had a mean carbon gradient of roughly 0.46–0.53 wt % C/mm from the broad surface 2 to the area 6 not enriched with carbon.

The subsequent hardening, likewise conducted essentially under the same conditions as in the first embodiment, Led to hardness values on the board surfaces 2 and the core 6, respectively, differing only slightly from the first embodiment, with good flatness of the plate 1. After a tempering period of 3 h at a temperature of 300° C., determined to be optimal, hardness values on the broad surface 2 of roughly 54–55 HRC (ca. 670 HV) and in core 6 of roughly 38 HRC (380 HV) were achieved, as FIG. 3 shows. The carbon-enriched boundary area 5 of the base material had a mean hardness gradient of roughly 15 HRC/mm from the broad surface 2 to the area 6 not enriched with carbon or only slightly enriched.

The base material of this embodiment of the invention appears particularly suited to the manufacture of table and trim saws as circular saws with set teeth of roughly 55 HRC. The hardness for ordinary saws of this type of manufactured tool steel is about 43–44 HRC.

A circular saw blade was produced from the base material according to the invention in order to determine the static bending strength C. The static bending strength C of the saw blade results as the quotient of a bending force F exerted in the static load case under defined conditions and a deformation f appearing at the load point. The saw blade had the diameter dimension $D_K$ and the thickness D listed for I in Table II. The diameter $D_I$ of an interior circular opening of the saw blade was 40 mm. The saw blade was clamped with a flange having a diameter $D_E$ of 118 mm. Thus there was a characteristic ratio of clamp and saw diameters $D_E/D_K$ with a value of 0.34. The measurement points at which the bending force F was exerted and at which the deformation f was measured were on a measuring circle 95 mm away from the outer edge of the flange. The bending force was 19.7 N and was measured at four points of the measurement circle on the front and back side of the saw blade.

TABLE II

Saw blade dimensions

| Saw Blade No. | Diameter $D_k$ in mm | Thickness D in mm |
| --- | --- | --- |
| I | 330 | 2.4 |
| II | 350 | 2.5 |
| III | 351 | 2.5 |

A mean static bending stiffness C of 143 N/mm was determined, which is contained in Table III in comparison to the values of the third embodiment

EXAMPLE 3

Material Utilized: 10 Ni 14 Cold-rolled Strip, Annealed
Sample Thickness: D=2.5–3.0 mm A thin-layer carburization was conducted on several samples with process parameters under conditions as in the first embodiment, whereby, as FIG. 2 illustrates, a boundary layer 5 with a mean penetration depth $A_t$ of roughly 0.5–0.6 mm resulted. The quotient of the carburization depth $A_t$ of the boundary area 5 of the thermochemically treated base steel and the thickness D of the base material had a mean value of about 0.20. FIG. 2 also shows that the carbon content directly on the broad surfaces 2 was between roughly 0.60–0.65 wt %. The carbon-enriched boundary area 5 of the base steel had a mean carbon gradient of roughly 0.48 wt % C/mm from the broad surface 2 to the area 6 not enriched with carbon. These gradients, low by comparison to the prior art, have the effect that not only is high wear resistance achieved on the broad surfaces 2, but also integrally high strength values of the base material according to the invention are achieved.

The subsequent hardening, conducted essentially under the same conditions as in the first embodiment, led to slightly lower hardness values than in the first embodiment, with good flatness of the plate 1. After a tempering period of 3 h at a temperature of 200°[C] as FIG. 3 shows, hardness values on the broad surface 2 of up to 54 HRC (ca. 650 HV) and in core 6 of roughly 31 HRC (310 HV) were achieved. The carbon-enriched boundary area 5 of the base material had a mean hardness gradient of roughly 17–20 HRC/mm from the broad surface 2 to the area 6 not enriched with carbon or only slightly enriched.

Tensile strength tests were conducted on six samples with dimensions of 12.5×3 mm after hardening and tempering the case-hardened base steel. A mean tensile strength value $R_t$ of roughly 1550 N/mm$^2$ was determined. By comparison, the tensile strength of a hardened and tempered tool steel used for known base materials had a mean value of $R_m$ of roughly 1600 N/mm$^2$.

Impact strength tests were conducted on six additional samples with dimensions of 55 mm×10 mm×3 mm after hardening and tempering the carburized base material. A mean impact strength value of roughly 60 J/cm$^2$ was determined. The comparative tests on six samples of hardened and tempered tool steel used for known base materials had a mean impact strength value of roughly 52 J/cm$^2$.

These tests show that, with the base material according to the invention, mean tensile strength values $R_m$ can be achieved that correspond roughly to the tensile strength $R_m$ of known base materials, that however, for the characteristic parameter of impact strength, so important when the blades are placed under stress in the cutting process, values can be achieved which are on average 15% higher than for hardened materials based on tool steel.

It was possible by metallographic analyses for an optimal textural composition of the base material according to the invention to be determined at varying distances from the broad surfaces 2. Such textural structures are indicated schematically by four microscopic views 9,10,11,12 in FIG. 3. The carbon-enriched boundary area 5 consists off a tempered mixed structure (views 9,10,11). This mixed structure contains martensite, in some cases with carbide segregations, a small amount of residual austenite and intermediate textures, the martensite content initially rising with increasing distance from the broad surfaces 2 in the direction of the area 6 not enriched with carbon to a maximal value (view 10) and thereafter nearly disappearing in the area 6 not enriched with carbon. The residual austenite content or the content of mixed structure initially decreases with increasing distance from the broad surfaces 2 in the direction of the area 6 not enriched with carbon to a local minimum value (view 10), slightly increases thereafter (view 11), and strongly declines sharply in an area 6 not enriched with carbon. View 12 shows a ferritic-perlitic textural structure in the core area 6 of the type characteristic of the basic structure of the base steel used.

In regard to the internal strains appearing in the base material according to the invention, it was possible to determine that optimal conditions are present in this sense when maximal internal pressure strains in the range of up to 0.90 GPa, preferably between 0.40–0.75 GPa exist in a distance from the broad surfaces 2 which is less than the carburization depth $A_r$. By contrast, internal tensile strains occur in the outer boundary area 5 with a known base material produced on the basis of tool steel. In operation of he saw, these internal tensile strains facilitate the introduction and propagation of cracks or provoke these phenomena. Combined with the repetitive temperature changes occurring in multiple use of the tool, this can also cause an accelerated material fatigue.

It is additionally advantageous if, after the hardening and tempering of the thermochemically treated base steel, the base material has maximum internal tensile strains up to roughly 0.60 GPa, preferably only in the range up to 0.20 GPa at a distance from the broad surface 2 which is equal to or slightly larger than the carburization depth $A_r$. With higher internal tensile strains, hardening cracks can easily form in this area. Thus it is of particular advantage if the internal tensile stresses again decrease with increasing distance from the broad surfaces 2 and then internal compressive strains with maxima in the range up to 0.30 GPa occur at a distance from the broad surfaces 2 which is greater than the carburization depth $A_r$. Under some conditions, the internal strain distribution in the base material can make a tensioning of saw blades with flattening hammers or machines superfluous.

The base material of this embodiment of the invention appears particularly suited to the production of circular saws with set teeth of roughly 57 HRC.

In order to determine the static bending stiffness C, two circular saw blades were produced from the base material according to the invention. The static bending stiffness C of the saw blades was determined according to the method described for the second embodiment. The saw blades had the diameter dimensions $D_K$ and thicknesses D listed in Table II for numbers II and III. The diameter $D_I$ of the internal circular opening of the saw blades was 40 mm, as in the second example. The saw blade was clamped with a flange $D_E$ having the same dimensions as in the second example. The positions of the measuring points and the level of the bending force were also identical to those for the second embodiment of the invention. The mean values obtained for bending stiffness are contained in Table III. Differing from he values above, the tempering temperatures lay between roughly 180° C. (II) and 220° C. (III)

TABLE III

Measured values of bending stiffness C

| Saw blade No. | Bending stiffness C in N/mm (mean values) |
|---|---|
| I | 143 |
| II | 147 |
| III | 142 |

Depending on its quality, tempering temperatures of 150–350° C. are generally practical for a thermochemically treatedand hardened base steel, taking into account its tempering resistance. The textural structure and the physical properties of the base material, such as the hardness profile curve, can be influenced by the tempering temperature and time, apart from the technical parameters of the thermochemical treatment and hardening. Thus, hardness values of roughly 57–58 HRC were measured on the surface of these samples.

On the basis of the values contained in Table III and of additional values obtained, the profiles of the static bending stiffness C of a conventional base material made of hardened tool steel and of a base material according to the invention for a characteristic ratio of clamped to saw diameter $D_E/D_K = 0.34$ are presented comparatively for different sheet thicknesses in FIG. 4. It is seen that 1½–2 times the bending stiffness C of conventional saw blades can be achieved for saw blades with the base material according to the invention.

FIG. 5 shows the results of a three-point bending test on flat samples 15 mm wide and with a thickness D of 2.8 mm made from a base material according to the invention prepared according to the third embodiment. The bearing spacing of the samples was 30 mm. The illustration reproduces a force-deformation diagram obtained from 1000 measured values. As the curve profile illustrates, the maximum bending force F is achieved at a deformation f of roughly 2.00 mm after exceeding the elasticity limit at a deformation f of roughly 0.75 mm at roughly 810 daN. The maximum bending strain that occurs is roughly 305 daN/mm². For decreasing bending force F thereafter, an additional deformation of the samples can be observed, which indicates that the fracture occurring at a deformation f of roughly 3.75 mm is not a shearing, but rather a deformation fracture. Such a fracturing behavior of the base material according to the invention offers a "set-aside opportunity" for saw blades and so forth produced from it, that is, an exchange can be made before the fracture appears, which increases the operating safety.

In summary, saws, cutoff disk and so forth made from the base material according to the invention offer the following advantages versus those known from prior art:

Due to the uniformly introduced carbon, the tools can be produced with high reproducibility of their properties.

The previously inevitable decarbonization in hot rolling and hardening can be compensated for, which eliminates regrinding of the broad surfaces. In cold rolling, the desired material thickness can be specified while bearing in mind the changes in dimensions occurring in the thermochemical treatment.

Higher hardnesses of the tool on the surface with identical operating safety can be achieved by a targeted thermochemical treatment and possibly by subsequent heat treatment, due to the graduated structure.

A hardness structure with fine-grained structure can be achieved after the thermochemical treatment of the base steel by quenching. In that way, the subsequent hardening process can be eliminated or the physical properties can be improved even further by a double hardening.

By appropriate selection of the treatment parameters in the thermochemical treatment, hardening and tempering there are a number of degrees of freedom for generating the carbon profiles, harness profile curves and distributions of internal strain and structure, an in consequence the desired component properties.

The heat crack formation of saws is reduced both in the cutoff process of red-hot profiled steel as well as for-temperature increases at high circumferential velocities in the machining of metal., especially in so-called fusion cutting.

Due to the low carbon content in the core, the danger of a hardening which could be hazardous to the safety of the operating personnel is reduced in case of unwanted introduction of heat.

Compressive strains at the surface can be created in structural transformation by the differing structures of surface and core and the associated change of volume during hardening and tempering. Accordingly, a strong but controlled inhomogeneity results, particularly in regard to the internal strain state of the saws, and has positive effects on usage properties, particularly in regard to a delayed material fatiguing and a lesser susceptibility of the surface to cracking.

The component strength can be increased integrally by the base material according to the invention. Thus the bending vibrations occurring in usage are reduced, particularly at high speed. A reduction of noise emission is the consequence. Al previous measures for reducing the noise emission of saws remain unaffected by the invention and can be additionally utilized.

The attenuation properties if mixed structures are better than those of pure martensite. An additional noise reduction results.

Sheet thickness can be reduced because of the higher component strength. A reduction of the cutting losses and thus a savings of material to be cut results from this, due to a smaller possible cutting gap.

For a constant sheet thickness, it is possible, due to the then comparatively stiffer blade to operate at higher cutting rates in the range of 25–75 m/min, whereby the cutting performance is significantly increased.

A certain substitution of the previously utilized tipped and stellitized saws or the hard chromium-plated gang and circular saws is then possible, due to the higher hardness of saws that can be achieved.

Due to the nonuniform hardness profile perpendicular to the cutting direction (sandwich structure), a toothed saw wears at differing rates across its surface. Thereby, a certain "self-sharpening effect" can result. Advantages in resharpening saws can also be noted.

A "set-aside opportunity" is provided for saw blades produced from base material according to the invention because of the appearance of deformation fracture mechanism, which increases the operating safety.

High carbon contents, which are a disruption in the vicinity of soldering and welding sites, can be avoided by partial thermochemical treatment. This is a considerable advantage in the field of metal machining.

Because of the softer core of the saws, it is possible to produce a so-called upset tooth by inserting a wedge. This was previously possible only for nickel steels.

| Reference symbols | |
|---|---|
| 1 | Plate of base material |
| 2 | Broad surface of 1 |
| 3 | Short edge surface of 1 |
| 4 | Long edge surface of 1 |
| 5 | Boundary area |
| 6 | Area not enriched with carbon |
| 7 | Contour of 8a, 8b |
| 8a | Saw blade blank, circular saw |

-continued

| Reference symbols | |
|---|---|
| 8a | Saw blade blank, gang saw |
| 9 | Microscopic view in 5 |
| 10 | Microscopic view in 5 |
| 11 | Microscopic view in 5 |
| 12 | Microscopic view in 6 |
| $A_t$ | Case-hardening depth |
| C | Static bending stiffness |
| D | Thickness of 1 |
| $D_E$ | Clamped diameter |
| $D_I$ | Inside diameter |
| $D_K$ | Saw diameter |
| F | Bending force |
| f | Deformation |
| $R_m$ | Tensile strength |

What is claimed is:

1. Base material for producing blank blades for circular saws, cutoff disks, gang saws as well as cutting and scraping devices, comprising a plate with two broad surfaces, two short edge sides and two long edge sides and consisting of a thermochemically carbon-enriched base steel plate having a base carbon content of less than 0.3 wt % carbon, said base steel plate having at least one boundary area enriched with 0.5–1.1 wt % carbon starting from at least one of said broad surfaces, characterized in that:

said boundary area being enriched with carbon transitions with a decreasing mean carbon gradient of 0.25–0.75 wt % C/mm into an area not enriched with carbon;

the base steel plate being hardened and tempered so that said boundary area enriched with carbon has a hardness of 50–63 HRC and transforms with a decreasing mean hardness gradient of 10–22 HRC/mm into said area not enriched with carbon, having a hardness of 20–40 HRC; and said edge sides of said base steel plate have a sandwich structure formed of said carbon-enriched boundary area and said area not enriched with carbon.

2. The base material according to claim 1, characterized in that said base steel plate has carbon-enriched boundary areas starting from both of said broad surfaces, whereby at said edge sides said base steel plate has a sandwich structure formed of said two carbon-enriched boundary areas and said area not enriched with carbon.

3. The base material according to claim 1, characterized in that said base steel plate in said boundary area is carburized for carbon-enrichment.

4. The base material according to claim 1, characterized in that said base steel plate in said boundary area is carbonitrided for carbon-enrichment.

5. The base material according to claim 1, characterized in that said base material of the steel plate is an unalloyed construction steel.

6. The base material according to claim 1, characterized in that said base material of the steel plate is a low-alloyed construction steel.

7. The base material according to claim 1, characterized in that a quotient of a carburization-depth of said carbon-enriched boundary area, at which the carbon content is 0.35 wt %, and the thickness between said two broad surfaces of said base steel plate, has a value of 0.15–0.40.

8. The base material according to claim 1, characterized in that at most 50% of the thickness of the base material between said two broad surfaces has the original hardness of said steel before the thermochemical treatment, the hardening and the tempering and at least 50% of the thickness of the base material between said two broad surfaces having a higher hardness.

9. The base material according to claim 1, characterized in that at most ⅓ of the thickness of the base material between said two broad surfaces has the original hardness of said steel before the thermochemical treatment, the hardening and the tempering and at least ⅔ of the thickness of the base material between said two broad surfaces having a higher hardness.

10. The base material according to claim 1, characterized in that said carbon-enriched boundary area of said base steel plate has a mean carbon gradient of 0.40–0.50 wt % mm from the broad surface to the area not enriched with carbon.

11. The base material according to claim 1, characterized in that said carbon-enriched boundary area of said base steel plate has a mean hardness gradient of 14–18 BRC/mm from said broad surface to said area not enriched with carbon.

12. The base material according to claim 1, characterized in that said carbon boundary area of said broad surface has a hardness of 52–55 HRC and said area not enriched with carbon has a hardness of 30–35 HRC.

13. The base material according to claim 1, characterized in that at a distance from said broad surfaces, which is less then a carburization-depth of said carbon-enriched boundary area, at which the carbon content is 0.35 wt %, said carbon-enriched boundary area has maximum compressive residual stresses in the range between 0.40–0.75 GPa.

14. The base material according to claim 1, characterized in that at a distance from said broad surfaces, which is equal to a carburization-depth of said carbon-enriched boundary area, at which the carbon content is 0.35 wt %, said carbon-enriched boundary area has maximum tensile residual stresses in the range up to 0.60 GPa.

15. The base material according to claim 1, characterized in that at a distance from said broad surfaces, which is greater than a carburization-depth of said carbon-enriched boundary area, at which the carbon content is 0.35 wt %, said carbon-enriched boundary area has maximum compressive residual stresses in the range up to 0.30 GPa.

16. The base material according to claim 1, characterized in that said carbon-enriched boundary area consists of a mixed micro-structure, which contains martensite, a slight portion of at least one constituent selected from the group consisting of (a) residual austenite and (b) intermediate stage microstructure.

17. The base material according to claim 1, characterized in that said base steel plate is thermochemically carbon-enriched only partially in the area of said broad surfaces.

18. The base material according to claim 1, characterized in that areas which are not enriched with carbon consist of at least one constituent selected from the group (c) mixed ferritic-perlitic microstructure and (d) bainite.

19. The base material according to claim 16, characterized in that the martensite contains carbides.

20. The base material according to claim 16, characterized in that with increasing distance from said broad surfaces in the direction towards said area not enriched with carbon, the martensite content initially increases to a maximum value and thereafter decreases to nearly zero in said area not enriched with carbon, and at least one constituent selected from the group consisting of residual austenite content and intermediate stage microstructure initially decreases to a certain value, thereafter increases and finally decreases, in said area not enriched with carbon, below said certain value.

* * * * *